United States Patent [19]

Ueda et al.

[11] Patent Number: 5,051,270

[45] Date of Patent: Sep. 24, 1991

[54] HIGH PROTEIN NUTRITIVE FOOD AND PROCESS FOR PREPARING SAME

[75] Inventors: Narichika Ueda, Tokushima; Akihisa Takaichi, Naruto, both of Japan

[73] Assignee: Otsuka Pharmaceutical Co., Ltd., Tokyo, Japan

[21] Appl. No.: 432,779

[22] PCT Filed: Feb. 1, 1989

[86] PCT No.: PCT/JP89/00102

§ 371 Date: Oct. 3, 1989

§ 102(e) Date: Oct. 3, 1989

[87] PCT Pub. No.: WO89/06908

PCT Pub. Date: Aug. 10, 1989

[30] Foreign Application Priority Data

Feb. 3, 1988 [JP] Japan .................................. 63-24704

[51] Int. Cl.$^5$ ............................ A23J 1/02; A23J 1/14
[52] U.S. Cl. ..................... 426/574; 926/656
[58] Field of Search ............... 426/656, 574, 440, 486

[56] References Cited

U.S. PATENT DOCUMENTS

| | | | |
|---|---|---|---|
| 4,018,935 | 4/1977 | Catlin | 426/802 |
| 4,045,585 | 8/1977 | Appleman | 426/532 |
| 4,049,840 | 9/1977 | Reesman | 426/448 |
| 4,244,974 | 1/1981 | Minami | 426/94 |
| 4,332,832 | 6/1982 | Buckley | 426/616 |
| 4,537,783 | 8/1985 | Liepa | 426/574 |
| 4,560,570 | 12/1985 | Rausing | 426/574 |
| 4,666,720 | 5/1987 | Sasamoto | 426/574 |
| 4,743,459 | 5/1988 | Gellman | 426/630 |
| 4,784,870 | 11/1988 | Yokoyama | 426/574 |

FOREIGN PATENT DOCUMENTS

| | | |
|---|---|---|
| 2924326 | 1/1981 | Fed. Rep. of Germany . |
| 54-92317 | 5/1981 | Japan . |
| 57-15526 | 11/1983 | Japan . |
| 60-30645 | 2/1985 | Japan . |
| 60-114164 | 6/1985 | Japan . |
| 7707487 | 1/1978 | Netherlands . |

OTHER PUBLICATIONS

Ann. Rev. Microbiol., 1983, 37:575–601.
Economic Microbiology, vol. 7, 1982, pp. 54–61.
Cereal Chem., 56(6):573–576 (1979).
Cereal Chem., 57(4):253–254 (1980).
Cereal Chem., 66(5):382–386 (1989).

*Primary Examiner*—Carolyn Paden
*Attorney, Agent, or Firm*—Sughrue, Mion, Zinn, Macpeak & Seas

[57] ABSTRACT

A high protein nutritive food characterized in that the food has a protein content of 40 to 85 wt. % (based on solids) and is prepared from a dough by heating the dough at a reduced pressure until the dough is dried to a water content of not higher than about 3 wt. %. The dough is made from a protein ingredient containing vegetable protein alone or in combination with animal protein, cereal flour or potato powder and water.

27 Claims, No Drawings

HIGH PROTEIN NUTRITIVE FOOD AND PROCESS FOR PREPARING SAME

The present invention relates to a high protein nutritive food, and more particularly to a high protein nutritive food containing large amounts of proteins, easy to eat and giving a light mouthfeel like snack foods and to a process for producing the food.

BACKGROUND ART

High protein nutritive foods are useful for patients who need to ingest large amounts of proteins, such as those with liver diseases, nephrosis syndrome, gastric ulcer, duodenal ulcer or the like and postoperative patients. They are also well suited as dietary foods for healthy persons.

Such high protein nutritive foods include powdery or granular soybean protein which is well known. Such soybean protein is very difficult to eat and is therefore usually prepared and taken in the form of a liquid as dissolved in water, milk or the like, but the liquid product has the drawback of being very disagreeable to the taste and difficult to drink. Further in recent years, various foods of low calorific value resembling snack cakes have been developed as dietary foods, and some of them have been made commercially available, whereas they in no way taste agreeable or feel satisfactory to eat in respect of feeling of eating (or texture) such as feel to the tooth, mouthfeel, melting in the mouth, etc. For example, Examined Japanese Patent Publication SHO 59-15615 discloses a process for preparing a high protein snacklike food by adding an alkali solution to casein to obtain dough with a water content of about 13 to about 18%, and extruding the dough at a high temperature and high pressure into an atmosphere with room temperature and ordinary pressure to expand the dough. However, the product obtained by this process inevitably has a high water content of 7 to about 10 wt. %, such that even if giving a crisp texture to some extent, the product fails to give a short and light texture and is not meltable smoothly in the mouth like potato chips. Further Examined Japanese Patent Publication SHO 62-12972 discloses a high protein snack food obtained by extruding soybean protein powder with addition of water, heating the extrudate in water, thereafter mixing the extrudate with soybean protein powder and freeze-drying the mixture. With this process, the extrudate is mixed with soybean protein and freeze-dried, so that the product feels hard and munching like dried soybean curd before reconstitution with water, gives a poor mouthfeel, is not soluble smoothly in the mouth and is therefore in no way satisfactory to eat.

DISCLOSURE OF THE INVENTION

The present invention provides a high protein nutritive food which contains proteins of good quality at high concentrations and which provides such excellent textures that it gives a short and light feeling of eating and is meltable smoothly in the mouth, and also a process for producing the same.

The above and other objects of the invention will become apparent from the following description.

The high protein nutritive food of the present invention is characterized in that the food has a protein content of 40 to 85 wt. % (based on solids) and is prepared from a dough comprising:

a) a protein ingredient containing vegetable high protein material or a mixture of a vegetable high protein material and an animal protein material, b) a cereal flour and/or a potato powder, and c) water, by heating the dough at a reduced pressure after shaping until the dough is dried to a water content of not higher than about 3 wt. %.

While conducting extensive research to fulfill the above object, we prepared cakelike foods from vegetable protein materials having a high protein content, such as wheat protein powder and soybean protein powder, by adding water to the protein material to obtain a dough, and cooking the dough by various methods However, the product was hard, adhered to the tooth, was not meltable in the mouth smoothly, felt like a powder and was not agreeable to eat in respect of the textures such as feel to the tooth, mouthfeel, melting in the mouth, etc. In the course of subsequent research, however, we prepared a food from such a vegetable high protein material by using a cereal and/or a potato powder conjointly with the protein material to obtain a dough, and heating the dough at a reduced pressure until the dough was dried to a water content of up to 3 wt. %. We have found that the food obtained feels short and very light in texture, does not feel powdery or adhere to the tooth, is smoothly meltable in the mouth and is very satisfactory to eat in respect of textures such as feel to the tooth, mouthfeel, melting in the mouth, etc. and that the food contains a high proportion of proteins of good quality free of undesirable thermal degradation. Thus, we have succeeded in fulfilling the above object and accomplished the present invention.

Thus, the high protein food of the present invention feels short and very light, is agreeable to eat with respect to textures such as feel to the tooth, mouthfeel, melting in the mouth, etc., contains a high proportion of proteins of good quality, is highly absorbable on digestion and is nevertheless low in fat and carbohydrate content. The food is very useful for patients with liver diseases or nephrosis syndrome, those with gastic ulcer, duodenal ulcer or the like who need to ingest large quantities of proteins after surgery, is very valuable also as a dietary food for healthy persons, and is pleasant and convenient to take like usual snack foods.

Although the reason why the food of the invention feels very agreeable to eat despite a high content of proteins of good quality still remains to be fully clarified, these advantages appear attributable to the fact that the dough is fully dried to a water content of not higher than 3 wt. % and that the dough is heated at a reduced pressure while being maintained at such a temperature that will thermally denature the proteins favorably to improve the texture of the proteins free of undesired thermal degradation thereof.

The protein material to be used in the process of the invention is any of various vegetable high protein materials which are usually at least about 70 wt. %, preferably at least about 80 wt. %, in protein content (based on solids). These materials may be used singly, or are preferably used as mixed with an animal protein material. Examples of such vegetable high protein materials are soybean protein powder, wheat protein powder and the like, and soybean protein powder is most preferable. One of these vegetable high protein materials can be used, or at least two of them are usable in admixture. Useful animal protein materials are those having a protein content of at least 20 wt. % based on the total solids content, such as milk, skim milk, milk protein powder, casein, albumin, globulin, gelatin, whole egg, egg white, egg yolk, whole egg powder, etc. Especially preferable to use are milk protein powder, casein, albumin, globulin and like milk proteins, gelatin, egg white and the like. Such animal protein materials need not always be used singly, but at least two of them can be used in admixture. Proteins derived from microorganisms may be used in combination with such protein materials.

Although vegetable high protein materials can be used singly as the protein ingredient, it is desirable to use a mixture of vegetable high protein material and animal protein material in order to give an improved nutritive effect and an improved texture or feel as a food. In this case, it is preferable to use the vegetable high protein material and the animal protein material in the proportions of 60 to 90 wt. % of the former and 40 to 10 wt. % of the latter, more preferably 70 to 80 wt. % of the former and 30 to 20 wt. % of the latter, calculated as proteins and based on the combined amount of proteins.

With the process of the invention, it is important to use a cereal flour along with such protein materials. The addition of the flour achieves improvements in the feel as food, taste, texture, etc. For the same purpose, a potato powder is usable in place of or in addition to the cereal flour. Examples of typical cereal flours include sweet corn powder and like corn powder, wheat flour, polished rice flour and the like. Examples of potato powders include common potato powder, etc. Among these examples, corn powder is especially desirable. These cereal flours and potato powders need not always be used singly, but at least two of them are usable in admixture.

With the process of the invention, dough is first prepared which comprises specified quantities of protein material(s) and cereal flour and/or potato powder. This can be accomplished by admixing water and, when desired, other additives with these ingredients, and kneading the mixture.

Useful additives include a wide variety of those for giving an increased nutritive value, flavor, taste and color and for other purposes Examples of such additives are those intended to enhance the nutritive value of the food to be obtained by the invention, such as vitamins including vitamin C, vitamin A, vitamin B1, vitamin B2, vitamin E, vitamin B12, nicotinic acid amide and calcium pantothenate, and minerals including calcium carbonate, sodium ferrous citrate, sodium chloride, potassium chloride and magnesium carbonate. Other examples of additives are natural and synthetic flavorings for imparting flavor to the food, sugar, soy source, miso, chemical seasonings, caramel and natural coloring agents for giving colors, dietary fibers such as polydextrose, pectin, sodium alginate, gum arabic and CMC, carbohydrates such as skim milk and lactic fermentation powder, and food materials such as fats.

The amounts of protein material, cereal flour or potato powder, additives and water to be used are determined suitably insofar as the high protein food prepared by mixing these ingredients together and heating the resulting dough in a vacuum has the water content and the protein content specified above. For example, calculated as solids based on the total solids content, the protein material is to be used in a proportion of about 55 to about 90 wt. %, preferably about 60 to about 80 wt. %, and the cereal flour and/or potato powder in a proportion of about 5 to about 25 wt. %, preferably about 6 to about 15 wt. %, the balance being the additives. It is desirable to use vitamins and/or minerals in a proportion of up to about 3 wt. % based on the total solids content. Water is used in a proportion of about 100 to about 160 wt. %, preferably 120 to 150 wt. %, based on the total dry solids content.

The above ingredients can be mixed together and kneaded into uniform dough by suitably using usual apparatus, conditions, etc. For example, when the powdery raw material ingredients are weighed out and vitamins and minerals are admixed therewith, these ingredients are premixed with the protein ingredient, other ingredients are then uniformly admixed with the premix and water and liquid animal protein material (such as milk or whole eggs) containing a large amount of water are admixed with the powdery mixture. In this procedure, the water and liquid animal protein material can be used as preheated to about 50° C. to thereby give a higher temperature of about 30° to about 35° C. to the resulting dough and render the dough soft and easy to mold subsequently.

According to the invention, the dough thus obtained is formed or molded into the desired shape. The dough can be formed or molded by the usual method, for example, with use of depositor, press rollers or the like. Although the dough can be shaped as desired, it is preferable to make the dough into plates with a thickness of 1.0 to 3.0 mm or into rods with a diameter or 5.0 to 10.0 mm in view of the ease of production or to make the resulting food easy to eat. The size or length of such plates or rods may be determined suitably to render the final product easy to eat and handle. When required, the dough or the final shaped product may be cut.

According to the present invention, it is critical that the shaped dough be heated at a reduced pressure and thereby dried to a water content of up to 3 wt. %, whereby a food of the invention can be obtained which feels short and light, is excellent in feel as a food in respect of textures such as feel to the tooth, mouthfeel, melting in the mouth, etc. and contains a high concentration of readily absorbable proteins of good quality free of undesired thermal degradation. Although the conditions for heating and drying at a reduced pressure can be determined suitably according to the kind of ingredients used, water content of the dough, etc., it is suitable to heat the dough at a reduced pressure of up to 40 mm Hg at 60° to 220° C. for about 10 to about 60 minutes. The boiling point of water at a pressure of not higher than 40 mm Hg is up to 35° C. Accordingly, even if the shaped dough is heated, the temperature of the dough itself will not increase excessively, permitting the proteins to be thermally denatured predominantly favorably and thereby give an improved flavor without becoming thermally degraded undesirably. Consequently, the food no longer feels powdery but tastes like snack foods, becomes expanded upon the vaporization of water and is thereby made to feel short. If the pressure applied during heat-drying exceeds 40 mm Hg, the resulting food will feel less agreeable to eat or the proteins are likely to become thermally denatured to excess to make the food feel disagreeable to eat or are likely to decompose to result in a lower nutritive value. The pressure to be applied is more preferably about 5 to about 20 mm Hg. The heating temperature and time are each variable suitably over a wide range insofar as the favorable denaturation of proteins occurs predominantly under the above vacuum condition without entailing the undesired thermal degradation while permitting the dough to be dried to a water content of up to 3 wt. %. It is generally suitable to heat the dough at 60° to 220° C. for about 10 to about 60 minutes. The heat source is not limited specifically, but various heat sources are usable such as hot water, steam, an electric heater, a microwave oven, far infrared rays, infrared rays, etc. It is especially desirable to heat the dough at 140° to 220° C. from above with far infrared rays and to heat the dough at 60° to 120° C. from below with another heat source.

When thus dried, the dough gives the desired high protein food of the invention. The product has a water content of up to about 3 wt. %, preferably up to 2 wt. % and a protein content of about 40 to about 85 wt. %, preferably about 60 to about 70 wt. % (based on the solids content). The use of the above-specified heat-drying means vaporizes water from the dough to the outside in the form of a gas to thereby form a porous internal structure having numerous fine pores, substantially without thermally denaturing the proteins to excess unfavorably in spite of the heating. Consequently the food provides such excellent textures that it gives a distinctly short texture, does not feel powdery, is meltable smoothly in the mouth, will not adhere to the tooth but feels pleasant to eat and is highly absorbable on digestion.

The food of the present invention, which has the above-mentioned excellent and unique feel as a food, contains proteins at a high concentration and can therefore be taken pleasantly as a health food of low carbohydrate and fat contents and also as a snack cake or the like in place of usual snack foods or the like for home use. It is further very suitable as the food to be taken for strengthening muscles through sports, body building, weight lifting, aerobics, jogging and like shaping-up exercises, and also as a supplemental nutritive food for patients with a liver disease or nephrosis syndrome, or those with gastric ulcer, duodenal ulcer or the like who need to ingest large quantities of proteins after surgery.

EXAMPLES

The present invention will be described in greater detail with reference to the following examples, in which the parts and percentages are all by weight unless otherwise specified.

Example 1

The specified amount of ingredients listed in Table 1 below were mixed together, 52 g of water was added to the mixture, and the resulting mixture was kneaded at 61 r.p.m. for 15 seconds three times (45 seconds) using a mixer (FORM 3150 B Machine, product of HOBART) to obtain dough.

The dough was made into plates, 24.0 mm x 36.0mm x 1.5 mm (thickness), with use of a noodle making machine and heated at 120° C. in a vacuum of 10 mm Hg for 30 minutes using a vacuum heat-drying device to obtain a sample of high protein nutritive food according to the invention.

The sample obtained will hereinafter be referred to as "sample A."

TABLE 1

| Ingredient | Amount used (g) |
| --- | --- |
| Wheat protein powder | 4.5 |
| Soybean protein powder | 23.0 |
| Milk protein powder | 4.5 |
| Skim milk powder | 2.4 |
| Dry whole egg powder | 1.5 |
| Lactic fermentation powder | 1.5 |

TABLE 1-continued

| Ingredient | Amount used (g) |
| --- | --- |
| Water-soluble gelatin | 0.8 |
| Sweet corn powder | 3.0 |
| Vitamins and mineral* | 1.2 |
| Vitamin A/D mix | 0.2 |
| Total | 42.6 |
| (Weight after drying | 42.0) |

The vitamins and mineral* listed above are vitamin B1, vitamin B2, vitamin B6, vitamin B12, vitamin C, nicotinic acid amide, calcium panthothenate and calcium carbonate, the same as hereinafter.

The water, protein, fat, carbohydrate, fiber and ash contents of sample A obtained were measured by the following methods. Table 2 below shows the result.

<Measuring methods>

Water: By "Food Additives 4," General Test Method 12, Method of Determining Water Content (Karl Fischer's method).
Proteins: By method of determining crude protein contents (Kjeldahl method).
Fats: In terms of crude fat content (ether extraction method).
Ash content: By heating the sample at 550° C. to remove organic substances and water, and measuring the resulting residue.
Carbohydrates: Expressed in a value obtained by subtracting the sum of the water, protein, fat, fiber and ash contents from 100 g.
Fibers: By improved Henneberg-Stohmann method.

TABLE 2

| Composition | % |
| --- | --- |
| Water | 1.6 |
| Proteins | 72.5 |
| Fats | 4.8 |
| Carbohydrates | 13.0 |
| Fibers | 0.1 |
| Ash | 6.6 |

Comparative Example 1

Dough was prepared in the same manner as in Example 1 of the invention from the mixture shown in Table 3 and having the same composition as in Example 1 except that the mixture contained no cereal flour. The dough was shaped and then heated in a vacuum under the same conditions as above to obtain a comparative food sample having a water content of about 2%.

The sample will hereinafter be referred to as "sample a."

TABLE 3

| Ingredient | Amount used (g) |
| --- | --- |
| Wheat protein powder | 4.5 |
| Soybean protein powder | 23.0 |
| Milk protein powder | 4.5 |
| Skim milk powder | 2.4 |
| Dry whole egg powder | 1.5 |
| Lactic fermentation powder | 1.5 |
| Water-soluble gelatin | 0.8 |
| Vitamins and mineral | 1.2 |
| Vitamin A/D mix | 0.2 |
| Total | 39.6 |
| (Weight after drying | 39.0) |

The water, protein, fat, carbohydrate, fiber and ash contents of sample a obtained were measured similarly. Table 4 below shows the result.

TABLE 4

| Composition | % |
|---|---|
| Water | 1.9 |
| Proteins | 76.7 |
| Fats | 4.9 |
| Carbohydrates | 8.3 |
| Fibers | 0.1 |
| Ash | 6.4 |

Example 2

High protein nutritive food samples (to be referred to as "sample B to sample J") each having a water content of about 2.0% were prepared in the same manner as in Example 1 using the same quantities of ingredients as listed in Table 3 (Comparative Example 1) and the specified amount of cereal flour listed in Table 5 below and admixed therewith.

TABLE 5

| Sample No. | Cereal flour used | Amount used (%) |
|---|---|---|
| Sample B | Sweet corn powder | 10 |
| Sample C | Sweet corn powder | 20 |
| Sample D | Sweet corn powder | 30 |
| Sample E | Potato powder | 10 |
| Sample F | Potato powder | 20 |
| Sample G | Polished rice flour | 10 |
| Sample H | Polished rice flour | 20 |
| Sample I | Wheat flour | 10 |
| Sample J | Wheat flour | 20 |

Comparative Example 2

The same doughs as used for preparing samples B to D in Example 2 above were similarly shaped and then baked in an oven at 120° C. at atmospheric pressure for 40 minutes to obtain comparative food samples (sample b to sample d).

<Sensory test>

The food samples obtained in Examples and comparative Examples given above were subjected to a sensory test (panel test) in the following manner. Three male and three female adults randomly selected and serving as panelists were allowed to freely take the samples and to evaluate them as to the feel thereof as itemized below according to five criteria.

Items of evaluation of feel as food (1) Feel to the tooth
(2) Adhesion to the tooth
(3) Melting in the mouth
(4) Hardness
(5) Mouthfeel
(6) Overall evaluation Criteria for evaluation +++ Very good
++ Good
+ Fair
± Poor
− Very poor Table 6 below shows the results obtained.

TABLE 6

| Test sample No. | Evaluation result | | | | | |
|---|---|---|---|---|---|---|
| | 1 | 2 | 3 | 4 | 5 | 6 |
| Invention | | | | | | |
| Sample A | +++ | +++ | +++ | +++ | +++ | +++ |
| Sample B | +++ | +++ | +++ | +++ | +++ | +++ |
| Sample C | +++ | +++ | +++ | +++ | +++ | +++ |
| Sample D | +++ | +++ | +++ | +++ | +++ | +++ |
| Sample E | ++ | +++ | +++ | ++ | +++ | ++ |
| Sample F | +++ | ++ | +++ | +++ | ++ | +++ |
| Sample G | ++ | +++ | ++ | ++ | +++ | ++ |
| Sample H | +++ | ++ | +++ | +++ | ++ | +++ |
| Sample I | ++ | +++ | +++ | ++ | +++ | ++ |
| Sample J | +++ | ++ | +++ | +++ | ++ | +++ |
| Comparative | | | | | | |
| Sample a | ± | + | − | ± | − | ± |
| Sample b | ± | + | − | ± | − | ± |
| Sample c | ± | + | − | ± | − | ± |
| Sample d | ± | + | − | ± | − | ± |

Table 6 given above reveals that the food samples (samples A-J) obtained by the process of the invention feel superior as food than the comparative food samples (samples a-d).

Examples 3-19

The ingredients given in Table 7 below were mixed together in the proportions listed in Table 7 to obtain 100 parts of a mixture, to which 120 parts of water was added, and the resulting mixture was agitated at a speed of 61 r.p.m. for 15 seconds three times (45 seconds) and thereby kneaded to obtain dough.

The dough was made into plates, 24.0 mm × 36.0 mm × 1.3 mm (thickness), using a noodle making machine. With ten holes, about 2 mm in diameter, formed in each plate, the shaped dough was heated at 200° C. from above with a heater and at 120° C. from below with another heater in a vacuum of 10 mm Hg for 13 minutes to give a high protein nutritive food sample.

FIG. 8 shows the composition of the food samples thus prepared.

TABLE 7

| Ingredient (%) | Example | | | | | | | | | | | |
|---|---|---|---|---|---|---|---|---|---|---|---|---|
| | 3 | 4 | 5 | 6 | 7 | 8 | 9 | 10 | 11 | 12 | 13 | 14 |
| Wheat protein powder | 10.40 | 11.20 | 9.60 | 10.70 | 10.20 | 9.70 | 10.90 | 10.20 | 10.00 | 20.00 | 10.00 | 15.00 |
| Soybean protein powder | 54.60 | 58.80 | 50.40 | 56.30 | 53.30 | 50.80 | 57.10 | 52.30 | 60.00 | 40.00 | 70.00 | 50.00 |
| Milk protein powder | 9.75 | 7.80 | 12.80 | 7.00 | 9.30 | 11.30 | 7.60 | 10.20 | 7.00 | 8.00 | 5.00 | 10.00 |
| Skim milk powder | 5.00 | 4.00 | 6.50 | 3.60 | 4.80 | 5.80 | 3.90 | 5.50 | 5.00 | 6.00 | 3.00 | 4.00 |
| Dry whole egg powder | 5.25 | 4.20 | 6.75 | 3.80 | 5.00 | 6.10 | 4.10 | 3.40 | 3.00 | 5.00 | 2.00 | 3.00 |
| Lactic fermentation powder | 3.25 | 2.60 | 4.15 | 2.30 | 3.20 | 3.80 | 2.50 | 3.40 | 3.00 | 5.00 | 0 | 3.00 |
| Water-soluble gelation | 1.75 | 1.40 | 2.30 | 1.30 | 1.70 | 2.00 | 1.40 | 1.80 | 2.00 | 3.00 | 0 | 2.00 |
| Sweet corn powder | 7.50 | 7.50 | 5.00 | 12.50 | 10.00 | 8.00 | 10.00 | 10.00 | 7.60 | 10.00 | 7.00 | 10.00 |
| Vitamins and | 2.50 | 2.50 | 2.50 | 2.50 | 2.50 | 2.50 | 2.50 | 3.20 | 2.40 | 3.00 | 3.00 | 3.00 |

TABLE 7-continued

| Ingredient (%) | Example | | | | | | | | | | | |
|---|---|---|---|---|---|---|---|---|---|---|---|---|
| | 3 | 4 | 5 | 6 | 7 | 8 | 9 | 10 | 11 | 12 | 13 | 14 |
| mineral | | | | | | | | | | | | |

TABLE 8

| Components (%) | Examples | | | | | | | | | | | |
|---|---|---|---|---|---|---|---|---|---|---|---|---|
| | 3 | 4 | 5 | 6 | 7 | 8 | 9 | 10 | 11 | 12 | 13 | 14 |
| Water | 1.8 | 1.8 | 1.8 | 2.00 | 2.00 | 1.9 | 2.00 | 2.00 | 1.3 | 1.8 | 2.00 | 2.00 |
| Proteins | 73.6 | 74.97 | 73.46 | 71.51 | 71.72 | 71.90 | 73.02 | 71.23 | 74.75 | 68.53 | 78.13 | 72.33 |
| Fats | 4.68 | 4.00 | 5.76 | 3.70 | 4.55 | 5.24 | 3.92 | 3.96 | 3.78 | 5.99 | 1.91 | 3.92 |
| Carbohydrates and fibers | 13.26 | 12.59 | 12.31 | 16.15 | 15.08 | 14.20 | 14.43 | 15.44 | 13.45 | 16.98 | 10.65 | 14.83 |
| Ash | 6.66 | 6.64 | 6.63 | 6.63 | 6.65 | 6.67 | 6.64 | 7.37 | 6.72 | 6.70 | 7.31 | 6.93 |

We claim:

1. A high protein nutritive food prepared by a process comprising:
    (1) Forming and shaping a dough comprising:
        (a) a protein ingredient comprising:
            (i) vegetable protein, or
            (ii) a mixture of vegetable protein and animal protein,
        (b) a cereal flour, a potato powder, or a mixture thereof, and
        (c) water, and
    (2) heating the dough in a vacuum until the dough is dried to a water content of not higher than about 3 wt. % and a protein content of 40 to 85 wt. % based on solids.

2. A high protein nutritive food as defined in claim 1 wherein the water content is up to 2 wt. %.

3. A high protein nutritive food as defined in claim 1 wherein the protein content is 60 to 70 wt. %.

4. A high protein nutritive food as defined in claim 1 wherein the vegetable protein is soybean protein.

5. A high protein nutritive food as defined in claim 1 or 2 wherein the protein ingredient is a mixture of vegetable protein and animal protein which comprises 60 to 90 wt. % of the vegetable protein and 40 to 10 wt. % of the animal protein based on the combined amount of protein.

6. A high protein nutritive food as defined in claim 5 wherein the vegetable protein is soybean protein.

7. A high protein nutritive food as defined in claim 5 wherein the vegetable protein content is 70 to 80 wt. %, and the animal protein content is 20 to 30 wt. %.

8. A high protein nutritive food as defined in claim 5 wherein the water content is up to 2 wt. %, the vegetable protein is soybean protein, and the cereal flour is sweet corn powder.

9. A high protein nutritive food as defined in claim 1 wherein the cereal flour is a corn powder.

10. A high protein nutritive food as defined in claim 1 wherein the water content is up to 2 wt. vegetable protein is soybean protein, cereal flour is sweet corn powder.

11. A high protein nutritive food as defined in claim 1 wherein the heating is in a vacuum of up to 40 mm Hg.

12. A high protein nutritive food as defined in claim 11 wherein the vacuum is about 5 to about 20 mm Hg.

13. A high protein nutritive food as defined in claim 11 or 12 wherein the heating is at 60° to 220° C. for about 20 to about 60 minutes.

14. A process for preparing a high protein nutritive food prepared by a process comprising:
    (1) forming and shaping a dough comprising:
        (a) a protein ingredient comprising:
            (i) vegetable protein, or
            (ii) a mixture of vegetable protein and animal protein,
        (b) a cereal flour, a potato powder, or a mixture thereof, and
        (c) water, and
    (2) heating the dough in a vacuum until the dough is dried to a water content of not higher than about 3 wt. % and a protein content of 40 to 85 wt. % based on solids.

15. A process as defined in claim 14 wherein the heating is in a vacuum of up to 40 mm Hg.

16. A process as defined in claim 15 wherein the vacuum is about 5 to about 20 mm Hg.

17. A process as defined in claim 15 or 16 wherein the heating is at 60° to 220° C. for about 10 to about 60 minutes.

18. A high protein nutritive food which comprises:
    (a) a protein ingredient comprising:
        (i) vegetable protein, or
        (ii) a mixture of vegetable protein and animal protein,
    (b) a cereal flour, a potato powder, or a mixture thereof, and
    (C) water;
    wherein said food has a water content of not higher than about 3 wt. % and a protein content of 40 to 85 wt. % based on solids.

19. A high protein nutritive food as defined in claim 18 wherein the water content is up to 2 wt. %.

20. A high protein nutritive food as defined in claim 18 wherein the protein content is 60 to 70 wt. %.

21. A high protein nutritive food as defined in claim 18 wherein the vegetable protein is soybean protein.

22. A high protein nutritive food as defined in claim 18 or 19 wherein the protein ingredient is a mixture of vegetable protein and animal protein which comprises 60 to 90 wt. % of vegetable protein and 40 to 10 wt. % of animal protein based on the combined amount of protein.

23. A high protein nutritive food as defined in claim 22 wherein the vegetable protein is soybean protein.

24. A high protein nutritive food as defined in claim 22 wherein the vegetable protein content is 70 to 80 wt. %, and the animal protein content is 20 to 30 wt. %.

25. A high protein nutritive food as defined in claim 22 wherein the water content is up to 2 wt. %, the vegetable protein is soybean protein, and the cereal flour is sweet corn powder.

26. A high protein nutritive food as defined in claim 18 wherein the cereal flour is a corn powder.

27. A high protein nutritive food as defined in claim 18 wherein the water content is up to 2 wt. %, the vegetable protein is soybean protein, and the cereal flour is sweet corn powder.

* * * * *